(12) United States Patent
Mei et al.

(10) Patent No.: US 7,278,156 B2
(45) Date of Patent: Oct. 2, 2007

(54) SYSTEM AND METHOD FOR ENFORCING SECURITY SERVICE LEVEL AGREEMENTS

(75) Inventors: Gee-Gwo Mei, Yorktown Heights, NY (US); Kun-Lung Wu, Yorktown Heights, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 10/453,951

(22) Filed: Jun. 4, 2003

(65) Prior Publication Data

US 2004/0255151 A1     Dec. 16, 2004

(51) Int. Cl.
G06F 9/44      (2006.01)
G06F 17/00     (2006.01)

(52) U.S. Cl. .......................................... 726/11; 726/13
(58) Field of Classification Search .................. 726/11, 726/13
See application file for complete search history.

(56) References Cited

U.S. PATENT DOCUMENTS

| | | | |
|---|---|---|---|
| 6,795,918 B1* | 9/2004 | Trolan | 713/160 |
| 7,028,179 B2* | 4/2006 | Anderson et al. | 713/154 |
| 7,058,974 B1* | 6/2006 | Maher et al. | 726/13 |
| 2004/0093381 A1* | 5/2004 | Hodges et al. | 709/204 |
| 2004/0148138 A1* | 7/2004 | Garnett et al. | 702/189 |
| 2004/0181476 A1* | 9/2004 | Smith et al. | 705/35 |
| 2004/0243699 A1* | 12/2004 | Koclanes et al. | 709/224 |

OTHER PUBLICATIONS

Henning, R., "Security Service Level Agreements: Quantifiable Security for the Enterprise?", 2000, ACM, pp. 54-60.☐☐*
Muller, N., "Managing Service Level Agreements", 1999, International Journal of Network Management, vol. 9, pp. 155-166.*
U.S. Patent Application entitled *Apparatus, System, and Method for Managing Quality-of-Service-Assured E-Business Service Systems*, U.S. Appl. No. 09/716,862, filed Nov. 20, 2000.

* cited by examiner

Primary Examiner—Matthew Smithers
(74) Attorney, Agent, or Firm—F. Chau & Associates, LLC; Frank V. DeRosa

(57) ABSTRACT

Systems and methods for providing e-business services based on security SLAs (service level agreements) in a hosted computing environment. More specifically, the systems and methods enable efficient enforcement of individualized security SLAs, wherein individualized SLA agreements are specified, mapped into security rules and continually monitored against system events via an efficient rule index to determine security violations and trigger proper actions.

29 Claims, 4 Drawing Sheets

SYSTEM AND METHOD FOR ENFORCING SECURITY SERVICE LEVEL AGREEMENTS

TECHNICAL FIELD OF THE INVENTION

The present invention is generally related to systems and methods for providing e-business services based on security SLAs (service level agreements) in a hosted computing environment. More specifically, the present invention relates to systems and methods for enforcing individualized security SLAs, wherein individualized SLA agreements are specified, mapped into security rules and continually monitored against system events via an efficient rule index to determine security violations and trigger proper actions.

BACKGROUND

Due to innovations in network computing technologies and applications, many companies, businesses and organizations currently provide e-business services on global communication networks such as the WWW (world wide Web) and the Internet. Such services are typically provided through an entity's Web site.

To effectively transact e-business over a communications network, it is critically important to develop systems and methods that enable an organization's Web site to be secure and continually functioning without interruptions. It is very difficult to maintain a secure Web site on continuous basis, however, when the Web site is continuously subjected to a large number of network attacks. Indeed, most organizations either do not have the necessary IT expertise to maintain secure Web sites and protect against attacks, or they cannot provide security in a cost effective manner. As a result, many organizations have outsourced their IT services, including the management of secure Web sites, to an IT service provider such as IBM Global Services.

A service provider typically provides computing services by hosting a large number of customer Web sites or applications in a relatively small number of data centers. In order to satisfy the needs of each individual customer, a service provider usually signs various service level agreements (SLA) with individual customers. In general, a SLA is a monetary, legal contract that specifies the minimum expectations and obligations that exist between a service provider and the customer. Such SLAs can include for example, requirements for quality of service (QoS) and security.

It can be a challenge to enforce individualized security SLAs in a hosted environment in which a large number of Web sites and applications are managed. Indeed, the number of individualized security SLAs can be large because individual clients have different security demands, and enforcing such demands can be difficult depending on the security system used. In addition, the rates and types of security attacks can be exceedingly large in a hosted environment. For example, a large number of virus attacks, security scans, denial of services and buffer overflows can occur simultaneously. Moreover, attacks may occur anywhere and at anytime. Sophisticated data consolidation and event correlation are usually needed to understand the nature of attacks.

Therefore, there is a need for efficient systems and methods to enforce security SLAs, especially in a hosted environment where a large number of customer Web sites are managed.

SUMMARY OF THE INVENTION

The present invention is directed to systems and methods for providing e-business services based on security SLAs (service level agreements) in a hosted computing environment. The present invention is further directed to systems and methods for enforcing individualized security SLAs, wherein individualized SLA agreements are specified, mapped into security rules and continually monitored against system events via an efficient rule index to determine security violations and trigger proper actions. Systems and methods for enforcing security SLAs according to the invention are especially useful in an environment where most of the computing services are provided from a relatively small number of large data centers throughout a global communications network such as the Internet.

In one embodiment of the invention, a method for enforcing security service level agreements comprises the steps of specifying one or more security service level agreements, mapping the service level agreements into security rules, and monitoring system events to determine security alerts and trigger actions based on the security rules. Preferably, the security rules are continually monitored against system events using an efficient security rule index to determine security violations and trigger proper actions.

In one embodiment, the security rules comprise if-condition-then-action rules, wherein a condition of each security rule is specified as a conjunction of predicate clauses, and wherein each predicate clause comprises an attribute, an operator and a value. The predicate clauses may comprise equality and non-equality operators.

Preferably, the security rule attributes are manifestations of the health conditions of the system, the nature and intensity of attacks and the costs of actions taken, for example. The security rules may be specified by experts and/or dynamically derived/modified/updated by analyzing security attack log data that is maintained in a database.

In another embodiment, the security rules are preferably maintained by a security rule monitor, which comprises an efficient rule matching engine that enables real-time matching of incoming system (security) events to security rules to determine if certain actions (security alerts) should be triggered. The system events comprise one or more (attribute, value) pairs that are directly available from raw system events, which are used to match security rules. Alternatively, the system events comprise one or more (attribute, value) pairs that are indirectly computed by a pre-event analyzer based on raw system events, system information, and/or profile data, for example.

In another embodiment of the invention, the rule matching engine uses an efficient security rule indexing scheme based on MKH (multiple key hashing) and hashed schemas, which enables the security rules to be quickly and efficiently matched to incoming system events. A preferred indexing scheme comprises assigning a unique clause ID to each unique predicate clause having the same attribute, and representing each individual security rule as a data point in a multidimensional space. More specifically, a rule coordinate is generated for each security rule using unique clause IDs corresponding to predicate clauses of the security rule. A MKH (multiple key hashing) scheme is then preferably used to store and index the security rule coordinates, as well as match security events with security rules via the security rule index, using a hashed scheme that is based on a subset of the attributes of the security rules.

The security rules monitor processes incoming events and can trigger security alerts and actions when a corresponding security rule matches an incoming event. Such actions may comprise dynamic updates to the security rules.

In other embodiments of the invention, post-event analysis (off-line) is preferably implemented for dynamically changing/updating the mapping of security SLAs and security rules based on, e.g., upgrades to system hardware and software, or by changes in other business activities.

These and other embodiments, aspects, features, and advantages of the present invention will become apparent from the following detailed description of the preferred embodiments, which is to be read in connection with the accompanying drawings.

DETAILED DESCRIPTION OF PREFERRED EMBODIMENTS

The present invention is directed to systems and methods for enforcing security SLAs in a hosted computing environment. In general, systems and methods for enforcing security SLAs according to the present invention utilize security rules that are generated based on security SLA agreements, wherein specified security SLAs are mapped into security rules that are continually monitored against system events using an efficient security rule index to determine security violations and trigger proper actions.

It is to be understood that the systems and methods described herein may be implemented in various forms of hardware, software, firmware, special purpose processors, or a combination thereof. In particular, the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations or configurations of the present invention.

Figure 1:
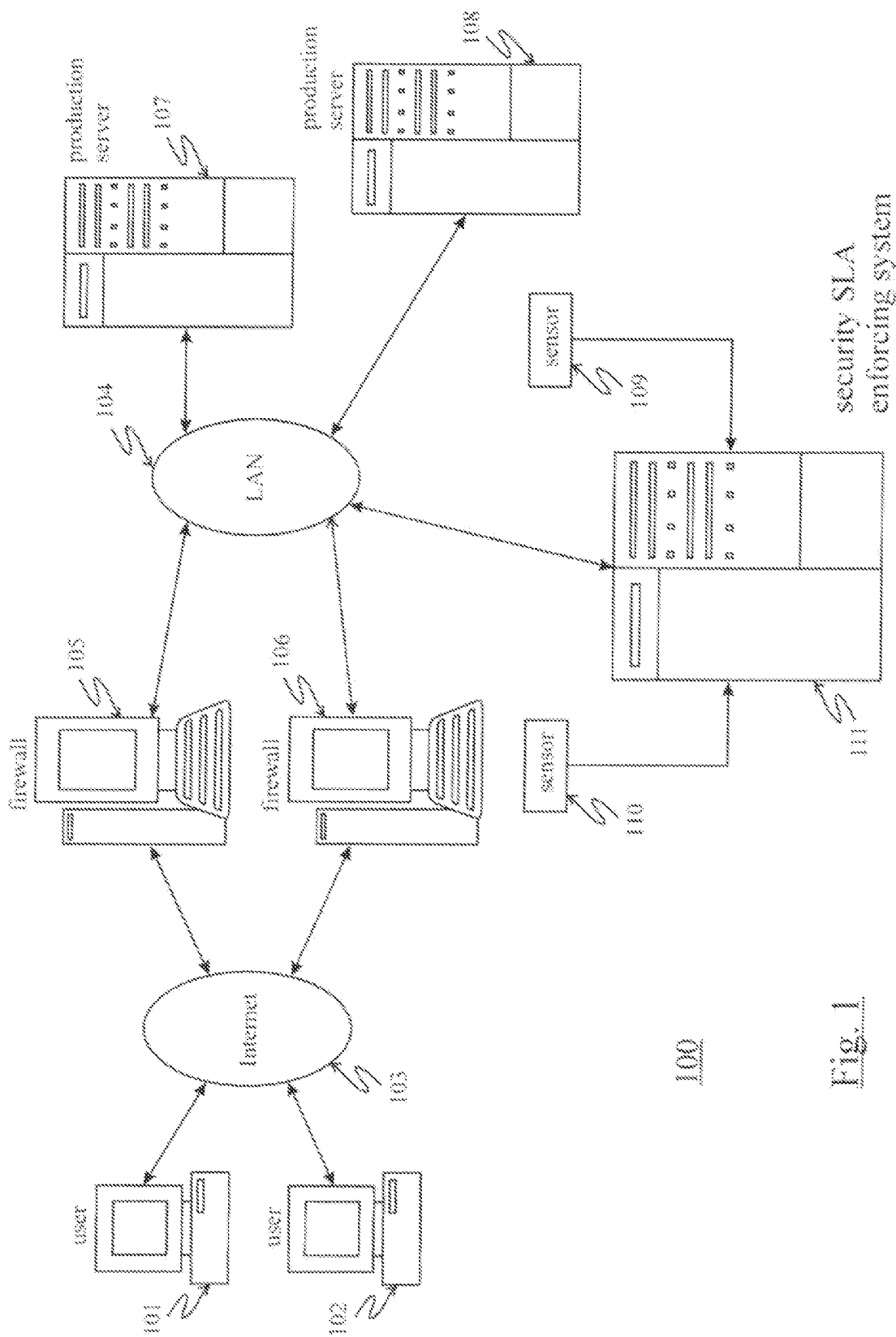
FIG. 1 is a block diagram of a system for enforcing security SLAs according to an embodiment of the present invention.

Referring now to FIG. 1, a block diagram illustrates a system for enforcing security SLAs according to an embodiment of the invention. More specifically, FIG. 1 depicts a hosted environment in which network traffic and host behavior are monitored by a security SLA enforcing system (111) according to the invention. The system (100) comprises a plurality of sensors (109, 110) that monitor network traffic, which are preferably placed at selected firewalls (105, 106) and production servers (107, 108). The output of the sensors (109, 110) are directed to the security SLA enforcing system (111). The security SLA enforcing system (111) comprises systems and applications according to the present invention for enforcing security SLAs. Preferred embodiments of the security SLA enforcing system (111) will be described in detail below with reference to FIGS. 2, 3 and 4, for example.

The production servers (107, 108) are server systems that host customer web sites or other computing applications. Preferably, the production servers (107, 108) are high performance computers, such as IBM mainframes or UNIX servers. The security SLA enforcing server (111) and the production servers (107, 108) are connected via a LAN (local area network) (104), which is typically behind the firewall servers (105, 106). A plurality of users (101, 102) access the computing services provided by the production servers (107, 108) via a global communications network (103) such as the Internet and the firewall servers (105, 106).

Although the system of FIG. 1 illustrates a framework for enforcing security SLAs, it is to be appreciated that the systems and methods described herein may be implemented with systems for managing service level agreements, in general. For example, the present invention may be implemented with the systems and methods disclosed in U.S. patent application Ser. No. 09/716,862, filed Nov. 20, 2000, entitled "Apparatus, System, and Method for Managing Quality-of-Service-Assured e-Business Service Systems," which is commonly assigned and incorporated herein by reference. This application describes Service Level Agreement (SLA) managing systems to monitor and enforce SLAs, which may be extended to include security SLA enforcement by implementing the systems and methods described herein. Indeed, it is to be understood that individual security SLAs according to the present invention can be signed into legal contracts.

Figure 2:
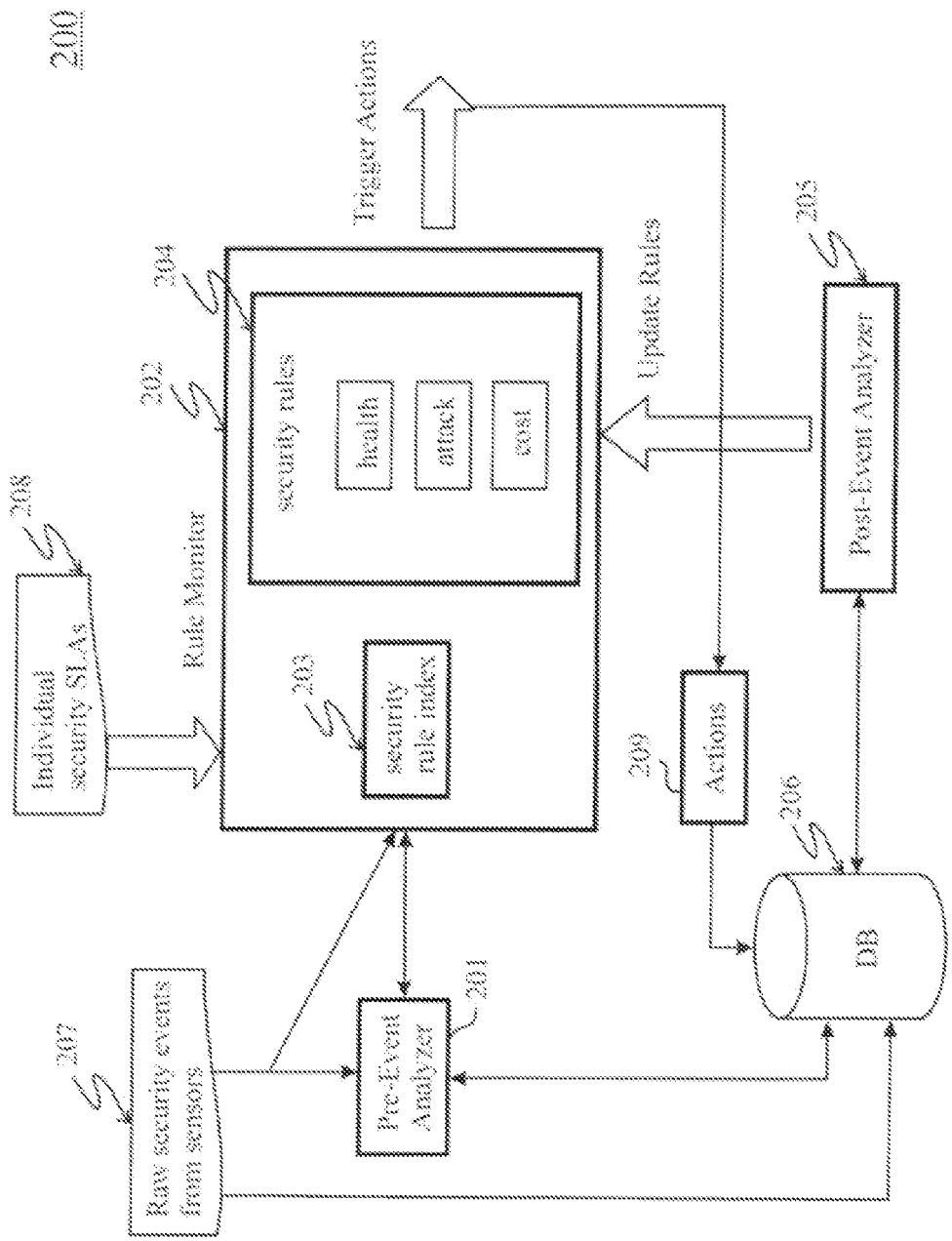
FIG. 2 is a block diagram of a system/method for enforcing security SLAs according to an embodiment of the present invention.

FIG. 2 is a block diagram of a system for enforcing individualized security SLAs according to an embodiment of the present invention, which is preferably implemented in the security SLA enforcing system (111) of FIG. 1. It is to be understood that FIG. 2 further depicts a flow diagram of a method for enforcing security SLAs according to an embodiment of the present invention. Referring now to FIG. 2, the system (200) comprises a rule monitor (202), a pre-event analyzer (201), and a post-event analyzer (205), which are primary modules of the system (200). The rule monitor (202) maintains a plurality of security rules (204), monitors the security rules (204) in real-time and triggers necessary actions upon detection of security violations according to the security rules (204). A plurality of individualized security SLAs (208) are translated into security rules (204).

An efficient security rule index (203) is constructed and maintained by the rule monitor (202) for fast matching of security events (201, 207) against the security rules (204). Security events preferably comprise one or more (attribute, value) pairs that are used to match against the security rules. Raw security events (207) that are collected from the sensors (109, 110 in FIG. 1) may be directly processed by the rule monitor (202). Alternatively, some raw security events (207) may be processed and/or aggregated by an pre-event analyzer (201) before such events are processed by the rule monitor (202).

The security events (207, 201) are preferably stored in a database (206). The database (206) further stores a history of actions that are taken during operation of the system (200). The stored security events and actions are analyzed by a post-event analyzer (205). The results of the post-event analyzer (205) may cause certain security rules (204) to be updated/changed.

In a preferred embodiment, the security rules (204) are implemented as if-condition-then-action rules. The security rules (204) are mapped or translated from individual security SLAs (208). Preferably, from the perspective of a hosting service provider, the conditions and actions in the security rules (204) are a manifestation of the health condition of the system, the nature and intensity of the attacks and the costs of the actions to be taken, for example. By way of example, the health of the system can vary depending on whether or not certain security software patches have been applied. After certain patches are applied, a system is considered to be in a better health condition as far as security is concerned. When a system is in a relatively healthy condition, it is less vulnerable to attacks and therefore, the system's tolerance of attacks is higher. On the other hand, if a system is in a relatively poor condition because certain security patches have not been applied, it is more susceptible to attacks. In such a case, a relative minor attack may be sufficient to cause certain security SLA to be violated. However, applying security software patches has costs associated therewith, since time and money is required to develop and apply security software patches. Furthermore, the system may have to be temporarily brought down to apply the patches. Moreover, resources are needed for various actions that may be taken after security violations are detected. For a service provider to conduct its business in a profitable manner, all these concerns are preferably manifested in the conditions and actions of the security rules (204) that are mapped from the individual security SLAs (208).

In a preferred embodiment, the conditions of security rules (204) comprise conjunctions of one or more predicate clauses. Each predicate clause preferably comprises an attribute, an operator and a value. An operator may comprise an equality (=), non-equality (">" or "<"), or a combination thereof. By way of example, the condition of a security rule (204) may be specified as a conjunction of the following four predicate clauses: (destination-ID=23), (attack-signature=22), (attack-count>15) and (health=poor). More specifically, the exemplary security rule specifies that if the number of certain types of attacks (with attack signature 22) to a certain destination IP address 23 in a certain period of time exceeds 15 and the system is in poor health condition, then certain action(s) can be taken.

It is to be appreciated that during operation of the system (200), attribute values can be directly obtained from raw security events (207) as produced by sensors (109, 110 in FIG. 1). Alternatively, an attribute value can be obtained after the pre-event analyzer (201) performs certain operations. By way of example, the value of the destination-ID attribute can be obtained directly from the raw security events (207), whereas the value for the attack-count attribute is aggregated by the pre-event analyzer (201). Those of ordinary skill in the art will readily appreciate that the types of operations needed for the pre-event analyzer (201) will depend on the nature of attributes that are specified in the conditions of the security rules (204). In some cases, access to certain profile tables stored in the database (206) may be used. Preferably, the pre-event analyzer (201) performs such operations fast and efficiently.

When the conditions of a give security rule are satisfied, one or more actions may be taken. For example, an action of a security rule (204) can be "sending an alert to the administrator" or "applying certain patches." Moreover, an action may comprise "blocking all requests from certain source IP addresses that are suspected to be making the majority of the attacks". Alternatively, an action can be "redirecting all the requests, from certain suspicious IP addresses, to a honey pot for further investigation."

Those of ordinary skill in the art will readily appreciate that the types of actions that may be taken will vary depending on the system state. For example, if there has been intense similar attacks targeting the same destination for a long period of time, no further actions are needed once the first actions have been taken. This is important because the conditions for certain security rules (204) may stay true for a long period of time because of the persistent and continuous attacks. In such cases, once the first actions are taken, there is no need to continue generating the same alerts and triggering the same actions repeatedly.

Those of ordinary skill in the art will also readily appreciate that, as the result of certain actions, the security rules (204) may be updated or changed. For example, if certain system upgrades are done and the system health is improved, certain thresholds for triggering actions may be increased. This may be performed using the post-event analyzer (205).

It is to be appreciated that the security rule index (203) is used for fast matching security events against the set of individual security rules (204). The security events preferably comprise (attribute, value) pairs that are processed by a rule matching engine of the rule monitor (202) to match the security rules (202) to incoming system events to determine security violations and trigger proper actions. Since each event is preferably matched in real-time against a large set of security rules (204), it is important to have an efficient rule index (203), otherwise, the security SLAs may not be properly enforced. Moreover, as more businesses are hosted in an environment with a small amount of data centers, the rates and types of attacks in the hosted environment tend to increase. Therefore, the rule index (203) preferably enables fast matching of security events.

In addition, the rule index (203) preferably enables dynamic insertion and deletion of security rules. Moreover, it is preferable for the rule index (203) to handle non-equality clauses efficiently, as predicate clauses in the security rules (204) may comprise non-equality operators, such as ">" or "<", as indicated above. Preferably, the rule index (203) supports three primary operations: insertion, deletion and searching (matching). Details of such operations will be discussed below with reference to FIGS. 3 and 4, for example.

The post-event analyzer (205) performs off-line analyses of the security events and actions stored in database (206). After examining the nature and intensity of the attacks, and the associated actions, the hoster may decide to change certain security rules (204). Such changes will be performed as needed by, e.g., deleting old security rules and inserting new security rules. The rule index (203) will be updated accordingly. Those of ordinary skill in the art will readily appreciate that the security rules (204) can also be changed at anytime by the administrator. For example, the system might have extra resources available for providing extra security for certain important clients. The administrator then can force the security rules (204) associated with such clients to be updated.

Figure 3:
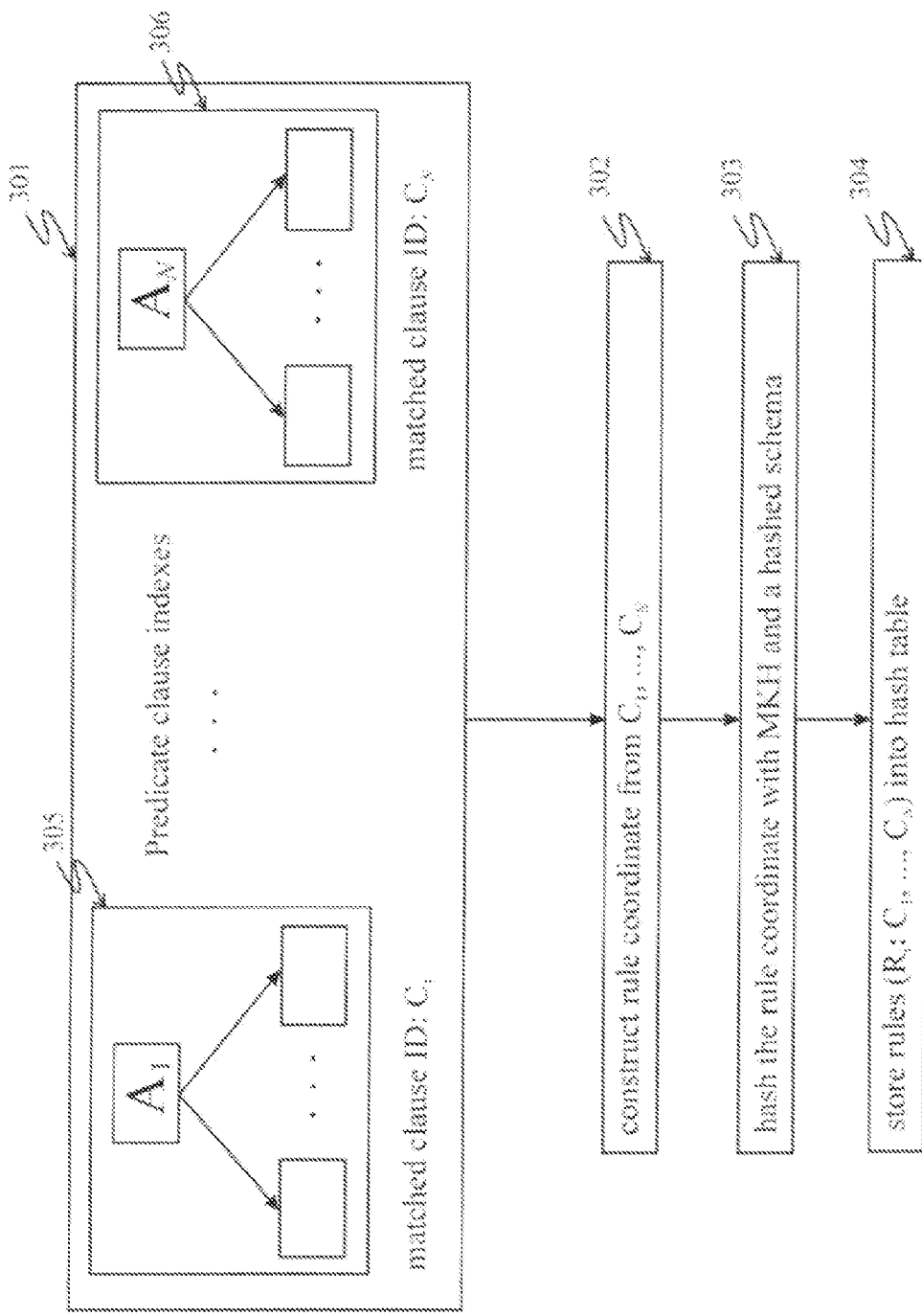
FIG. 3 is a flow diagram of a method for constructing an index for security rules according to an embodiment of the present invention.

FIG. 3 is a flow diagram illustrating a method of constructing a rule index according to an embodiment of the present invention. In particular, FIG. 3 illustrates a method of inserting a security rule into a security rule index. In general, the condition of each security rule is mapped into a data point in a multidimensional space based on its predicate clauses. For each attribute, a unique non-zero ID is assigned to each individual clause. A zero is used to indicate that no predicate clause is specified on an attribute by a given security rule. For example, (3, 0, 4, 5) represents a security rule that has no predicate clause specified on the second attribute.

More specifically, referring to FIG. 3, an initial step for inserting a given security rule into the rule index is to identify matched predicate clause Ids for each attribute specified in the predicate clauses of the given security rule (step 301). More specifically, each individual attribute $(A_1, \ldots A_n)$ in the set of attributes used to construct the security rules, comprises an index into all predicate clauses associated with the attribute. For instance, attribute $A_1$ may comprise one or more predicate clauses such as $A_1=1$, $A_1<3$, $A_1=4$, $A_1=5$, etc. Each predicate clause associated with attribute $A_1$ is assigned a unique clause ID. For example, predicate clause $A_1=1$ may be assigned ID=1, predicate clause $A_1<3$ may be assigned ID=2, predicated clause $A_1=4$ may be assigned ID=3, and predicate clause $A_1=5$ may be assigned ID=4, etc.

A predicate clause index (305, 306) is preferably constructed for each attribute to enable fast matching of predicate clauses of a given security rule (to be inserted into the rule index) to the assigned predicate clause IDs. It is to be appreciated that various methods can be used for generating the predicate clause indexes (305, 306). For example, a hash table can be maintained for each operator with the attribute value as the hash key. Alternatively, an array can be maintained for each operator with the attribute value as the array index.

Thus, in step (301), each predicate clause of a given security rule to be inserted in the rule indexes is matched to a predicate clause ID using the predicate clause indexes (305, 306). If, for a given attribute of the rule being inserted, a predicate clause ID does not exist, a predicate clause ID will be assigned, and the predicate clause index will be updated.

After the matched clause IDs are identified (step 301), a security rule coordinate is constructed from the matched predicate clause IDs (step 302). In other words, a rule coordinate will be represented by a string of predicate clause IDs for each attribute of the security rule. Obviously, if the security rule does not include a given attribute, the predicate clause ID for such attribute will be "0" in the string $(C_1, \ldots, C_n)$.

The security rule coordinate $(C_1, \ldots, C_n)$ is then combined with a hashed schema and then it is hashed using multiple key hashing (MKH) (step 303) to generate a key (or hash value) for the security rule. Then, rule coordinate $(C_1, \ldots, C_n)$ and an associated rule ID $(R_i)$ are stored in a rule hash table (step 304) based on the hash value computed in step 303.

Preferably, the hashing process (step 303) is performed using MKH, which is well-known in the art. Although there may be a large number of different attributes which may be used for the MKH computation, such computation of MKH is preferably limited to a subset of such attributes based on a hashed schema. A hashed schema is similar to a mask over the attributes, wherein the hashed schema is preferably used to determine which subset of attribute values is to be used for the MKH computation. The attribute values that are masked by the hashed schema are ignored in the MKH computation.

It is to be appreciated that the subset of attributes (keys) that are used for the MKH computation are preferably selected based on, for example, the amount of discrimination such attributes provide to result in a more random computation that limits collisions, as is understood in the art. Generally, non-equality predicate clauses are less efficient for MKH. Therefore, since there can be many attributes whose operators are mainly of non-equality types, the number of such attributes included in the MKH computation is preferably be controlled. As a result, a predetermined set of hashed schemas are preferably used to determine the subsets of attributes whose values are to be included in the MKH computation. For those security rules that use a certain subset of attributes, a hashed schema can be preferably predefined according to the nature of the attributes.

It is to be appreciated that a deletion operation for removing a security rule from the rule index is performed similar to the insertion operation (discussed above with reference to FIG. 3), except that the security rule is removed from the hash table after it is first identified. In particular, similar to step (301, the condition of the security rule to be deleted is used to find the matched predicate clause IDs from individual attributes. Then, the rule coordinate (as specified by the string of matched clause IDs $(C_1, \ldots, C_n)$) is used to compute a hash value using MKH with a hashed schema. The hash value is then used to find the stored rule, which is then removed.

Figure 4:
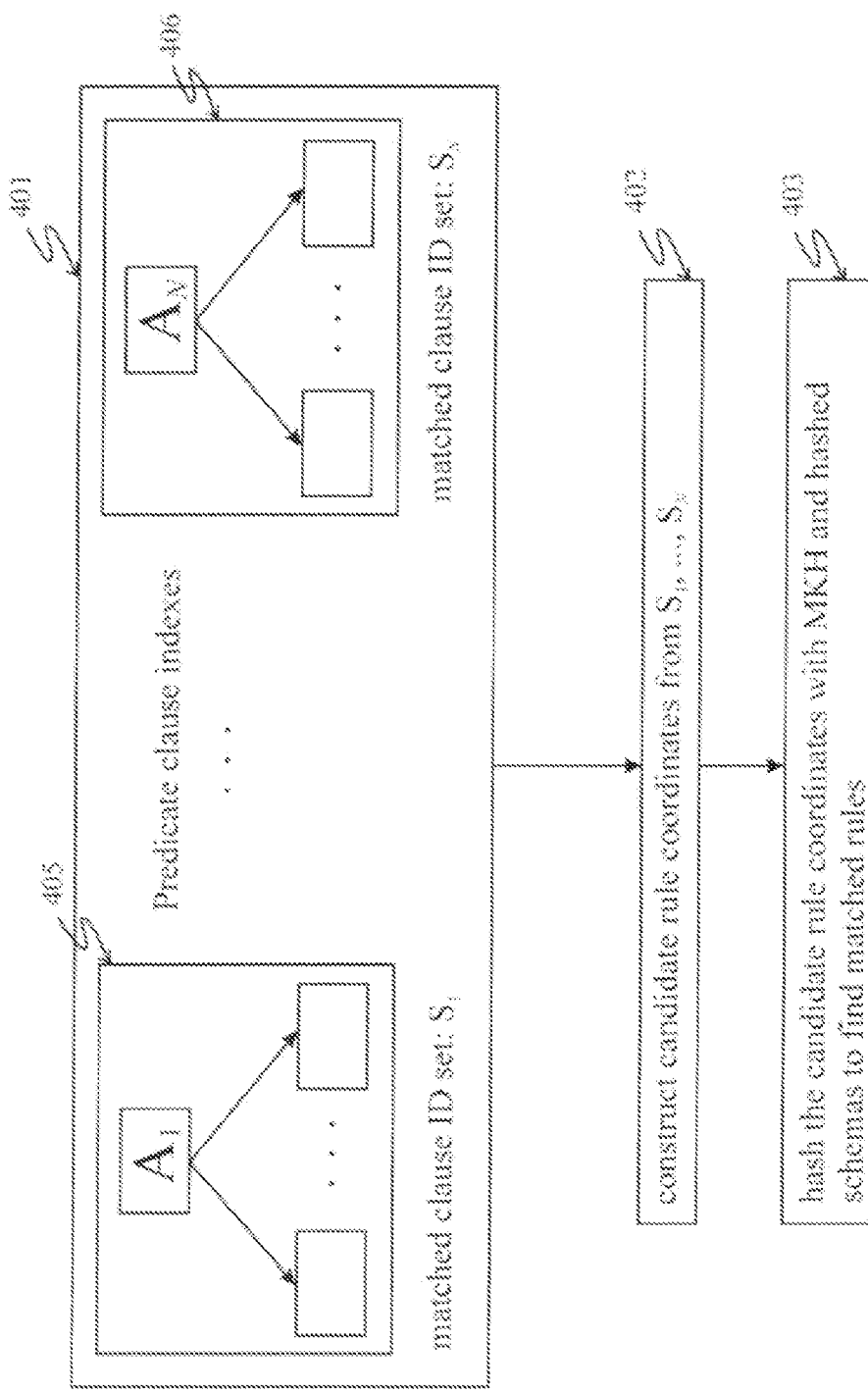
FIG. 4 is a flow diagram of a method for matching security events with security rules using a rule index according to an embodiment of the present invention.

FIG. 4 is a flow diagram of a method for matching a system event against security rules using a security rule index, according to an embodiment of the present invention. As noted above, system events are preferably represented as attribute, value pairs. Accordingly, when security events are received, the event value for a given attribute is used to find a set of matched predicate clause IDs for the attribute using the predicate clause indexes (405, 406) (step 406). In contrast to the insertion operation described above with reference to FIG. 3, each event value for a given attribute may match one or more predicate clause IDs for the given attribute. For example, with respect to attribute $A_1$, an event value of "4" can match predicate clauses $(A_1=4)$ and $(A_1<5)$, where $A_1$ is the attribute name. Therefore, for each attribute $(A_1, \ldots, $ and/or $A_n)$ comprising a system event, a set containing one or more matched predicate clause IDs is returned as a result of the processing in step (401). Obviously, if a system event does not include a particular attribute, no set "S" of clause IDs will be returned for such attribute.

After the matched predicate clause ID sets are found (step 401), one or more candidate rule coordinates are constructed using the matched predicate clause ID sets (step 402). More specifically, a candidate rule coordinate is derived by selecting one clause ID from each matched clause ID set. For example, a candidate rule coordinate can be constructed using the first clause ID from each returned set $(S_1, \ldots, S_n)$. All candidate rule coordinates are derived based on the different combinations of the clause IDs in the returned sets "S".

Then, the candidate rule coordinates generated in step 402 are used to find any rules that are stored in the rule hash table (step 403). In particular, each candidate rule coordinate is hashed using MKH and the hashed schemas to generate hash values (keys) that are matched to keys in the hash table associated with the security rules indexes in the table.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for enforcing security service level agreements, comprising the steps of:
   Specifying one or more security service level agreements;
   mapping said one or more security service level agreements into security rules; and
   monitoring system events to determine security alerts and trigger actions based on the security rules.

2. The method of claim 1, wherein said security rules are based on one of system health conditions, a cost of actions taken, a nature of attacks, and a combination thereof.

3. The method of claim 1, wherein the step of monitoring system events to determine security alerts and trigger actions based on the security rules comprises using a security rule index to match a security rule to a system event.

4. The method of claim 1, wherein the security rules comprise conditions that are specified as a conjunction of predicate clauses, wherein each predicate clause comprises an attribute, an operator and a value, and further comprising building an index to the security tiles based on the predicate clauses.

5. The method of claim 4, wherein the step of building an index to the security rules comprises the steps of:
   assigning a unique predicate clause ID to each unique predicate clause having the same attribute;
   constructing a rule coordinate for a security rule using associated predicate clause IDs;
   indexing the rule coordinate and an associated rule ID for the security rut using a multiple key hash function.

6. The method of claim 5, wherein the step of indexing comprises:
   determining a hashed schema that comprises a subset of attributes; and
   performing a multiple key hash computation using only those attributes assosiated with said hashed schema.

7. The method of claim 4, wherein the system events comprise one or more (attribute, value) pairs directly available from raw system events, which are used to match security rules.

8. The method of claim 4, wherein the system events comprise one r more (attribute, value) pairs that are indirectly computed from raw system events, which are used to match security rules.

9. The method of claim 1, wherein triggering actions comprises blocking certain sources from making requests or redirecting certain requests to a honey pot for further investigation.

10. The method of claim 1, further comprising dynamically updating security rules based on a triggered action.

11. The method of claim 1, further comprising dynamically updating security rules by off-line post-event analyses.

12. The method of claim 1, wherein said system events comprise one of raw system events, system events generated from raw system events, and a combination thereof, and wherein the step of monitoring system events comprises the steps of:
   matching said system events with security rules; and
   maintaining state information based on said matching.

13. The method of claim 12, wherein the security rules comprise if-condition-then-action rules.

14. The method of claim 13, wherein a condition of a security rule is specified as a conjunction of predicate clauses, wherein each predicate clause comprises an attribute, an operator and a value.

15. The method of claim 14, wherein a system event comprises one or more (attribute, value) pairs, and wherein said step of matching is performed by matching said one or more (attribute, value) pairs of said system event to predicate clauses of a security rule.

16. The method of claim 15, wherein said (attribute, value) pairs of said system event are directly available from raw system events.

17. The method of claim 15, wherein said (attribute, value) pairs of said system event are indirectly derived from one or more raw system events, said state information, other database tables, and a combination thereof.

18. A program storage device readable by a machine, tangibly embodying a program of instructions executable by the machine to perform method steps for enforcing security service level agreements, the method steps comprising:
   specifying one or more security service level agreements;
   mapping said one or more security service level agreements into security rules; and
   monitoring system events to determine security alerts and trigger actions based on the security rules.

19. The program storage device of claim 18, wherein said security rules are based on one of system health conditions, a cost of actions taken, a nature of attacks, and a combination thereof.

20. The program storage device of claim 18, wherein the instructions for monitoring system events to determine security alerts and trigger actions based on the security rules comprise instructions for performing the step of using a security rule index to match a security rule to a system event.

21. The program storage device of claim 18, wherein the security rules comprise conditions that are specified as a conjunction of predicate clauses, wherein each predicate clause comprises an attribute, an operator and a value, and further comprising instructions for performing the step of building an index to the security rules based on the predicate clauses.

22. The program storage device of claim 21, wherein the instructions for building an index to the security rules comprise instructions for performing the steps of:
   assigning a unique predicate clause ID to each unique predicate clause having the same attribute;
   constructing a rule coordinate for a security rule using associated predicate clause IDs;
   indexing the rule coordinate and an associated rule ID for the security rule using a multiple key hash function.

23. The program storage device of claim 22, wherein the instructions for indexing comprise instructions for performing the steps of:
   determining a hashed schema that comprises a subset of attributes; and
   performing a multiple key hash computation using only those attributes associated with said hashed schema.

24. The program storage device of claim 21, wherein the system events comprise one or more (attribute, value) pairs directly available from raw system events, which are used to match security rules.

25. The program storage device of claim 21, wherein the system events comprise one or more (attribute, value) pairs that are indirectly computed from raw system events, which are used to match security rules.

26. A system for maintaining network security, comprising:
   a host system for managing an e-business application that is accessible on a communications network; and
   a security system for monitoring traffic at one or more nodes in the communications network to enforce security rules as specified by a security service level agreement between the host system and the e-business application.

27. The system of claim 26, wherein the security system comprises:
   one or more sensors disposed at different nodes in the communications network for sensing raw system events;
   a rule monitoring system for maintaining said security rules, and comprising a rule matching engine that enables real-time matching of system events to said security rules to determine if certain security actions should be triggered.

28. The system of claim 27, wherein the rule monitoring system comprises a rule index that is used by the engine to match security rules to system events.

29. The system of claim 28, wherein the system events comprise raw system events from he sensors, and wherein the system further comprises an event analyzer to generate system events from raw system events.

* * * * *